US006997635B2

(12) United States Patent
Liu et al.

(10) Patent No.: US 6,997,635 B2
(45) Date of Patent: Feb. 14, 2006

(54) LATCH STRUCTURE FOR REMOVABLY MOUNTING A SIDE PANEL OF AN ELECTRONIC PRODUCT

(75) Inventors: Sheng-Ming Liu, Taipei (TW); Ching-Shih Chen, Taipei (TW)

(73) Assignee: High Tech Computer, Corporation, Taoyuan (TW)

( * ) Notice: Subject to any disclaimer, the term of this patent is extended or adjusted under 35 U.S.C. 154(b) by 135 days.

(21) Appl. No.: 10/388,514

(22) Filed: Mar. 17, 2003

(65) Prior Publication Data
US 2004/0012209 A1 Jan. 22, 2004

(30) Foreign Application Priority Data
Jul. 16, 2002 (TW) ................. 91210814 U

(51) Int. Cl.
H04B 1/38 (2006.01)
H01R 13/74 (2006.01)
(52) U.S. Cl. .................. 403/329; 403/19; 403/20; 403/326; 403/393; 220/4.02; 206/320; 312/223.1; 312/223.2; 312/265.5; 312/265.6; 292/116; 292/148; 361/683
(58) Field of Classification Search .............. 403/19, 403/20, 326, 329, 340, 393; 206/320; 220/4.02; 361/683; 312/223.1, 223.2, 265.5, 265.6; 292/116, 148, 156, 302, DIG. 11
See application file for complete search history.

(56) References Cited
U.S. PATENT DOCUMENTS

| 832,284 | A | * | 10/1906 | Ernest | 220/326 |
|---|---|---|---|---|---|
| 4,436,329 | A | * | 3/1984 | Metzger | 292/150 |
| 4,462,142 | A | * | 7/1984 | Hickling | 403/329 |
| 4,673,100 | A | * | 6/1987 | Reis et al. | 220/324 |
| 4,968,174 | A | * | 11/1990 | Krasznai | 403/327 |
| 5,056,251 | A | * | 10/1991 | Connor et al. | 403/340 |
| 5,347,673 | A | * | 9/1994 | Nickels, Jr. | 403/348 |
| 5,898,172 | A | * | 4/1999 | Masui et al. | 403/329 |
| 5,943,208 | A | * | 8/1999 | Kato et al. | 312/223.1 |
| 5,969,776 | A | * | 10/1999 | Han | 312/223.1 |
| 6,004,690 | A | * | 12/1999 | Van Lerberghe | 429/100 |

(Continued)

OTHER PUBLICATIONS

Nokia's Owner Manual for Cellular Phone 8390, Apr., 2002, pp. 83, 85 and Legal page.*

Primary Examiner—Daniel P. Stodola
Assistant Examiner—Ernesto Garcia
(74) Attorney, Agent, or Firm—Birch, Stewart, Kolasch & Birch, LLP

(57) ABSTRACT

A latch structure for a mobile electronic device (1), for example, a personal digital assistant (PDA) is disclosed. The latch structure comprises a side flange (20) of a cover (10) and a side panel (30). The side flange (20) includes a cantilever (200) and at least a first engaging portion (205). The cantilever has a slanted face (201) and a lock (203) on a free end thereof. The lock has a first ramp (207). The side panel detachably connects to the side flange and defines a hole (301). The side panel includes a second engaging portion (303) and a third engaging portion (305). The hole corresponds to the slanted face. The second engaging portion has a second ramp (307) corresponding to the first ramp of the lock. The lock engages with the second engaging portion in a first position and disengages from the second engaging portion in a second position. The first engaging portion engages with the third engaging portion in the first position and disengages from the third engaging portion in the second position.

1 Claim, 7 Drawing Sheets

U.S. PATENT DOCUMENTS 6,439,798 B1 * 8/2002 Blanchot et al. ............ 403/329
6,563,927 B1 * 5/2003 Mote et al. ............ 379/433.11
6,796,625 B1 * 9/2004 Lauchner et al. ........... 403/329
6,809,921 B1 * 10/2004 Wu et al. .............. 379/433.11

* cited by examiner

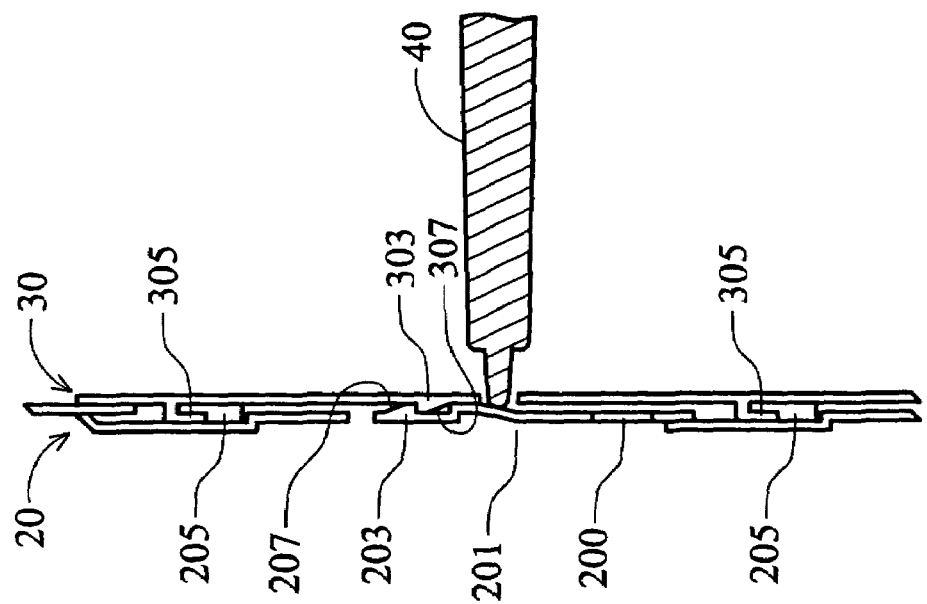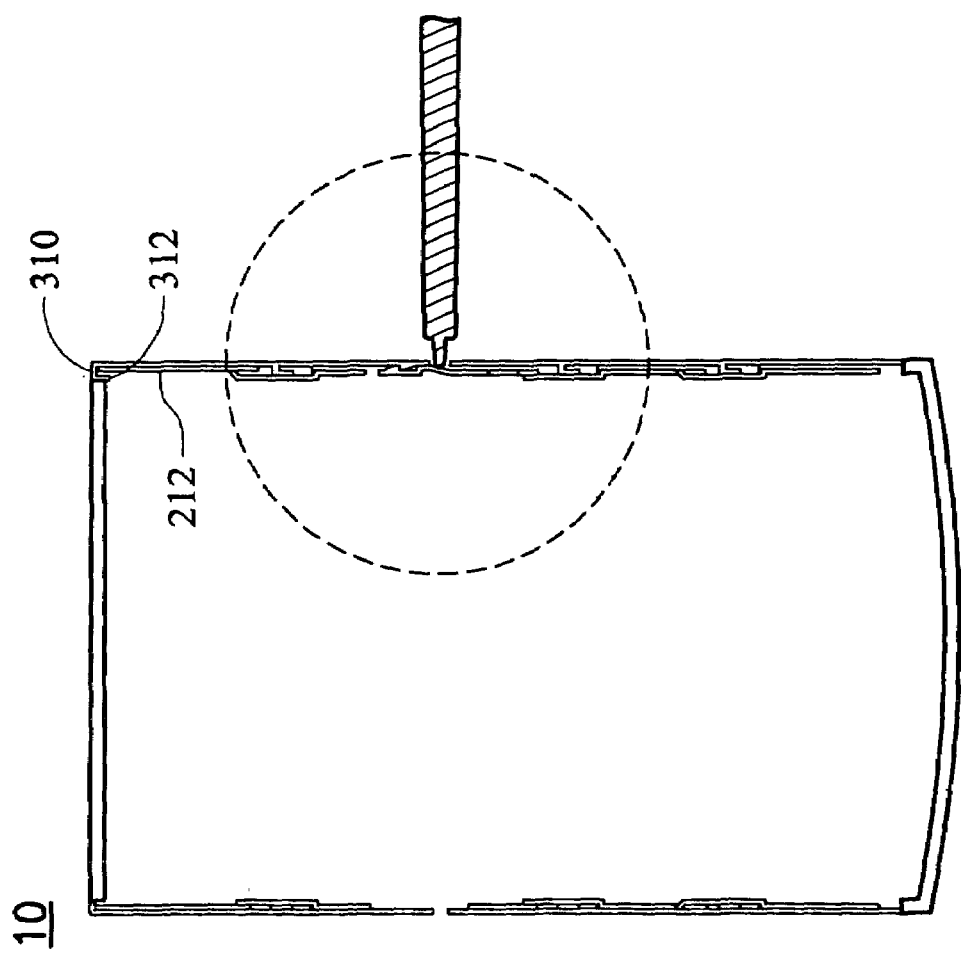

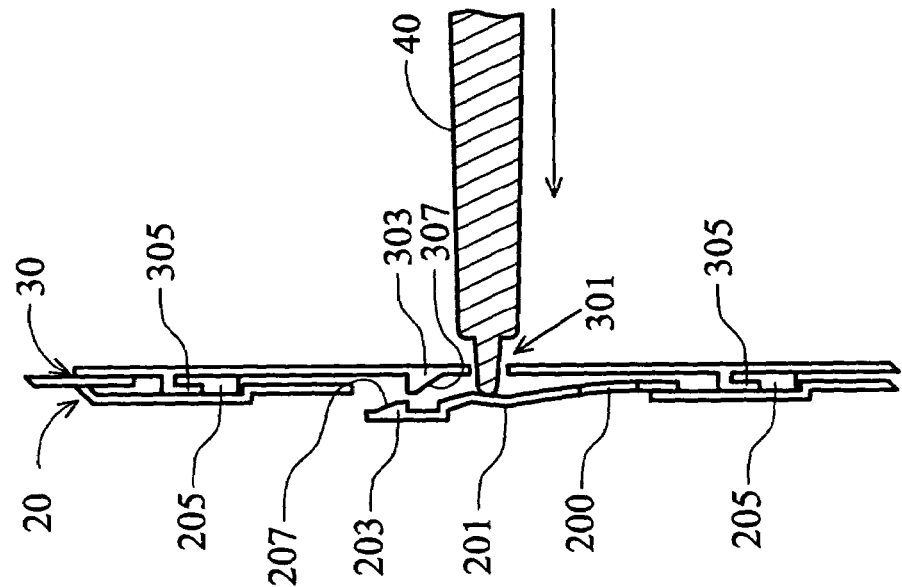
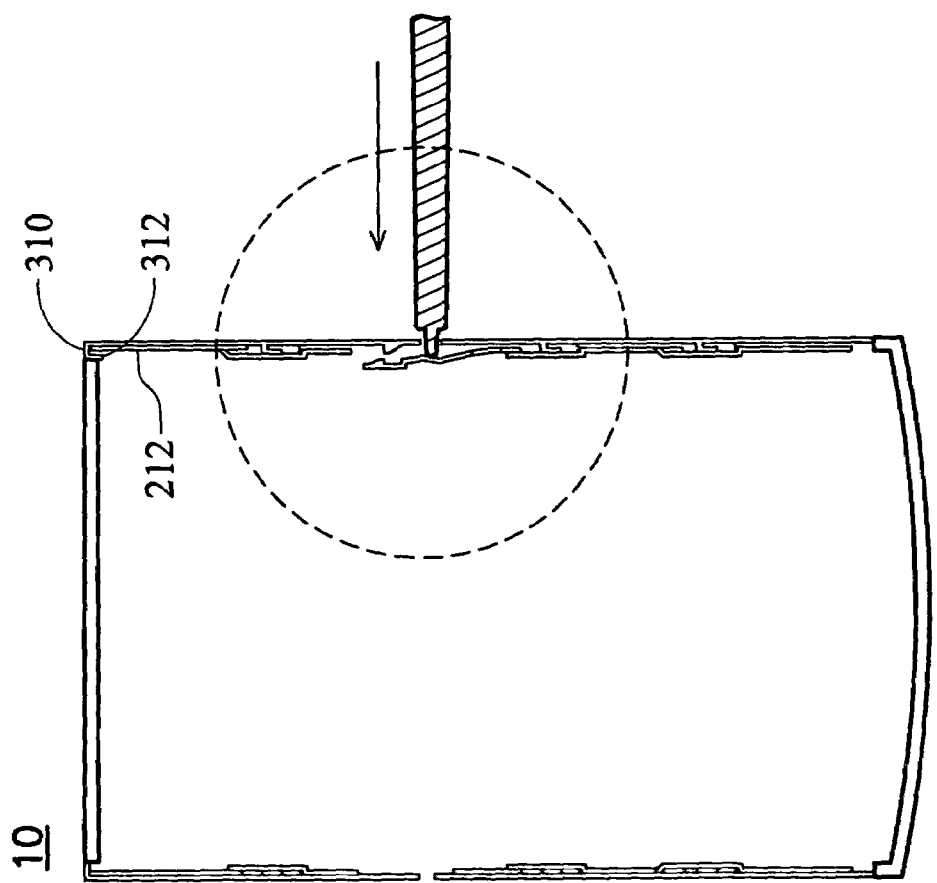
FIG. 5b
FIG. 5a

LATCH STRUCTURE FOR REMOVABLY MOUNTING A SIDE PANEL OF AN ELECTRONIC PRODUCT

BACKGROUND OF THE INVENTION

1. Field of the Invention

The present invention relates in general to a latch structure, and particularly to a latch structure which can removably secure a side panel of an electronic product to a cover thereof.

2. Description of the Related Art

Currently, an electronic product, for example, a personal digital assistant (PDA) is designed to be small and lightweight for portable consideration. The PDA comprises front and rear covers which are secured to a mainframe of the PDA by screwing side flanges of the covers to lateral sides of the mainframe. To cover the screw fastening, side panels are then attached to the side flanges of the front cover, respectively. The side panels may be provided with rugged outer faces for facilitating grip of a user of the PDA. Furthermore, the side panels are secured to the side flanges of the front cover by inserting hooks at the side panels into holes in the side flanges of the front cover. Such a securing is not reliable so that when the PDA is subject to shock, the side panels can be easily separated from the side flanges of the front cover.

Thus, the invention provides a latch structure for mounting a side panel to a side flange of a front cover of an electronic product, for example, a PDA. The latch structure can reliably secure the side panel to the side flange. Furthermore, the latch structure can easily be released by a stylus of the PDA or an implement similar to the stylus.

SUMMARY OF THE INVENTION

An object of the present invention is to provide a latch structure for reliably mounting a side panel to a side flange of a front cover of a PDA to thereby hind screwing fastening between the side flange and a mainframe of the PDA, wherein the latch structure is releasable by using a stylus of the PDA.

The present invention provides a latch structure for a mobile electronic product, such as a personal digital assistant (PDA). The latch structure comprises a cover having a side flange for fastening to a lateral side of a mainframe of the mobile electronic product, and a side panel for detachably mounting to and covering the side flange. The side flange includes a cantilever and at least a first engaging portion, wherein the cantilever has a slanted face and a lock on a free end of the cantilever. The lock has a first ramp, and the first engaging portion and the lock are disposed on the same side of the side flange. The side panel defines a hole, wherein the side panel includes a second engaging portion and a third engaging portion, the hole corresponds to the slanted face, and the second engaging portion has a second ramp facing the side flange and corresponds to the lock. The second ramp corresponds to the first ramp, and the lock engages with the second engaging portion in a first position and disengages from the second engaging portion in a second position; the second engaging portion and the third engaging portion are disposed on the same side of the side panel, and the first engaging portion engages with the third engaging portion in the first position and disengages from the third engaging portion in the second position.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

The present invention can be more fully understood by reading the subsequent detailed description in conjunction with the examples and references made to the accompanying drawings, wherein:

FIG. 1b is a cross-sectional view of a front cover of the PDA and the side panel of FIG. 1a;

FIG. 2b is a partially enlarged view of FIG. 2a;

FIG. 3b is a partially enlarged view of FIG. 3a;

FIG. 4a is a view similar to FIG. 3a, showing a stylus being used to release the latching between the side panel and the side flange;

FIG. 4b is a partially enlarged view of FIG. 4a;

FIG. 5a is a view similar to FIG. 4a showing the latching being released;

FIG. 5b is a partially enlarged view of FIG. 5a;

FIG. 6b is a partially enlarged view of FIG. 6a.

DETAILED DESCRIPTION OF THE INVENTION

Figure 1A:
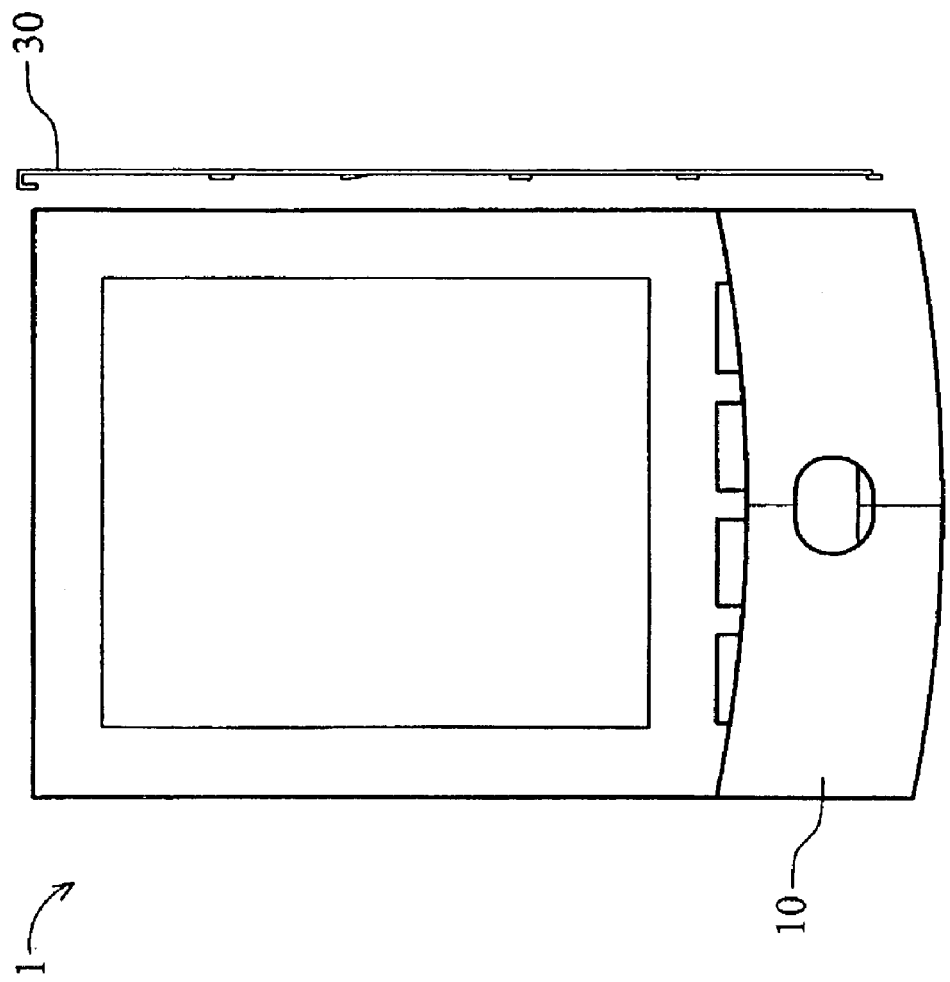
FIG. 1a is a front view showing a PDA and a side panel of the PDA in accordance with the present invention.

FIG. 1a depicts a mobile electronic product 1, for example, a Personal Digital Assistant (PDA), which has a front cover 10 and a side panel 30. To complete the PDA 1, two side panels 30 are required to be attached to two lateral sides of the PDA 1; since the two side panels 30 have the same structure and are attached to the front cover 10 in the same manner, only one side panel is shown and illustrated in this embodiment.

Figure 1C:
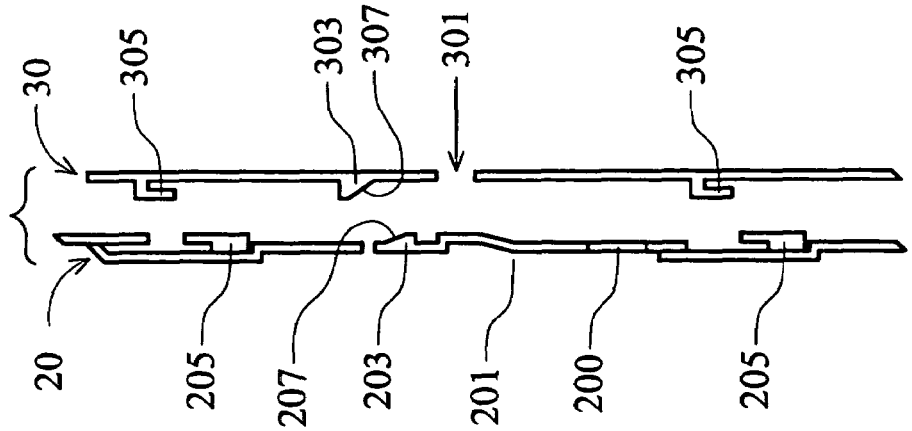
FIG. 1c is a partially enlarged view of FIG. 1b.
Figure 1B:
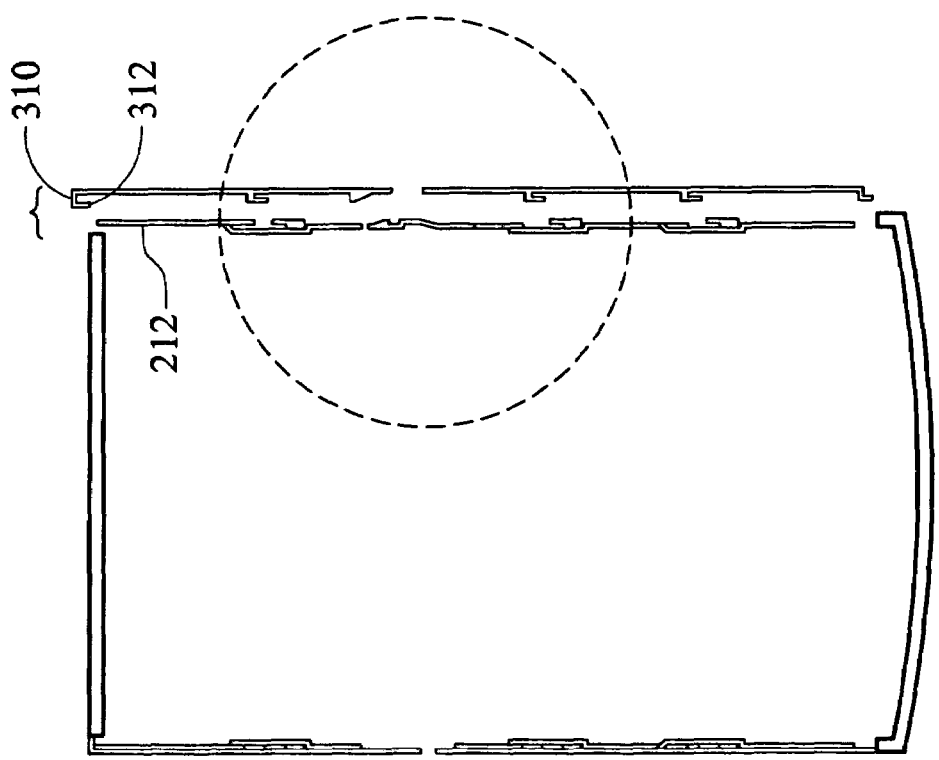

Referring to FIGS. 1a–1c, the cover 10 has a side flange 20 which can be fastened to a lateral side of a mainframe of the PDA 1 by screws (not shown). The side flange 20 comprises a cantilever 200 and at least a first engaging portion 205. The first engaging portion 205 is L-shaped. The cantilever 200 has a slanted face 201 and a lock 203 on a free end of the cantilever 200. The lock 203 has a first ramp 207. The first engaging portion 205 is formed on the side flange 20, and the first engaging portion 205 and the lock 203 are disposed on the same side of the side flange 20.

The side panel 30 is movably connected to the side flange 20 with a hole 301 on the side panel 30. The side panel 30 comprises a second engaging portion 303 and a third engaging portion 305. The third engaging portion 305 is L-shaped. The hole 301 corresponds to the slanted face 201 and the second engaging portion 303 faces the side flange 20. The second engaging portion 303 has a second ramp 307 facing the side flange 20 and corresponds to the lock 203. The second ramp 307 corresponds to the first ramp 207 and the lock 203 is engaged with the second engaging portion 303 in a first position and disengages from the second engaging portion 303 in a second position. The second engaging portion 303 and the third engaging portion 305 are disposed on the same side of the side panel 30. The first engaging portion 205 is engaged with the third engaging portion 305 in the first position and disengages from the third engaging portion 305 in the second position.

The side panel 30 further comprises a depressible portion 310 and a fourth engaging portion 312 at a top thereof, and the side flange 20 further comprises a beam 212 at a top thereof. The fourth engaging portion 312 is located beside the depressible portion 310.

Figure 2A:
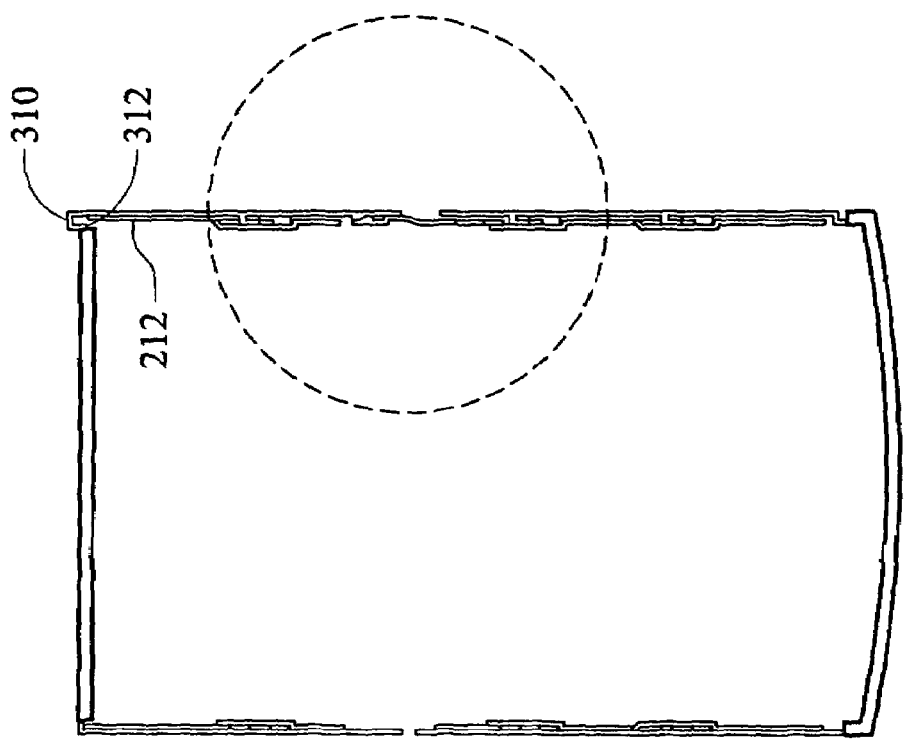
FIG. 2a is a cross-sectional view showing a situation that the side panel has not been latched to a side flange of the front cover of the PDA.
Figure 2B:
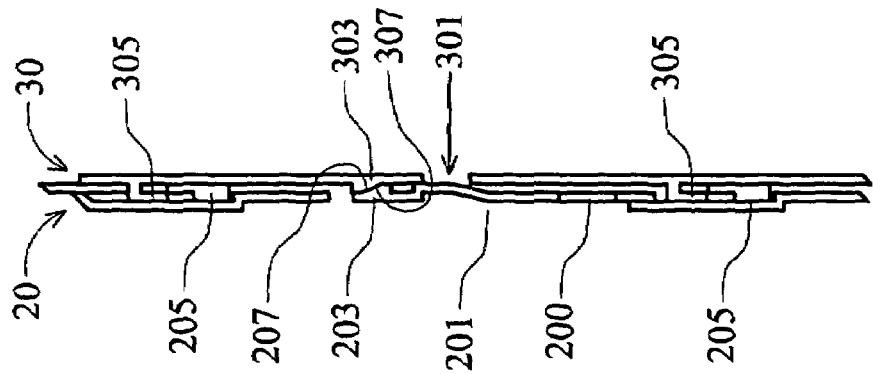

As shown in FIG. 2a and FIG. 2b, the first ramp 207 of the lock 203 corresponds to the second ramp 307 of the second engaging portion 303, and the first engaging portion 205 corresponds to the third engaging portion 305. When applying external force on the depressible portion 310 from top to bottom as shown in these figures, the side panel 30 moves in the direction of the applied force until the depressible portion 310 and the fourth engaging portion 312 engage with the beam 212. When the beam 212 and the fourth engaging portion 312 are connected together, a click is heard, indicating that the engaging process is completed.

Figure 3B:
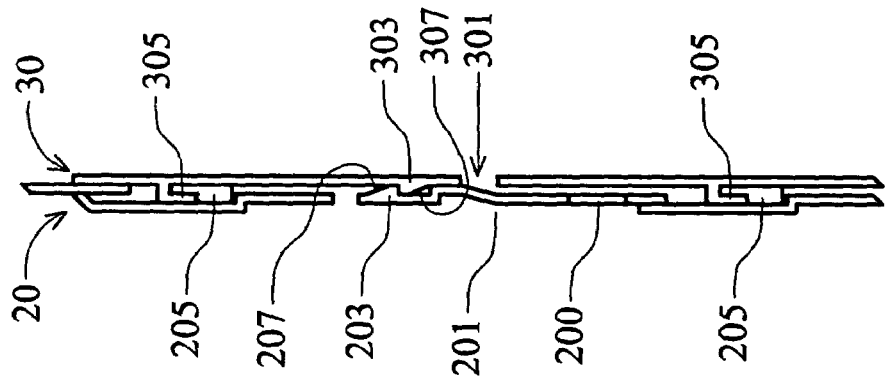
Figure 3A:
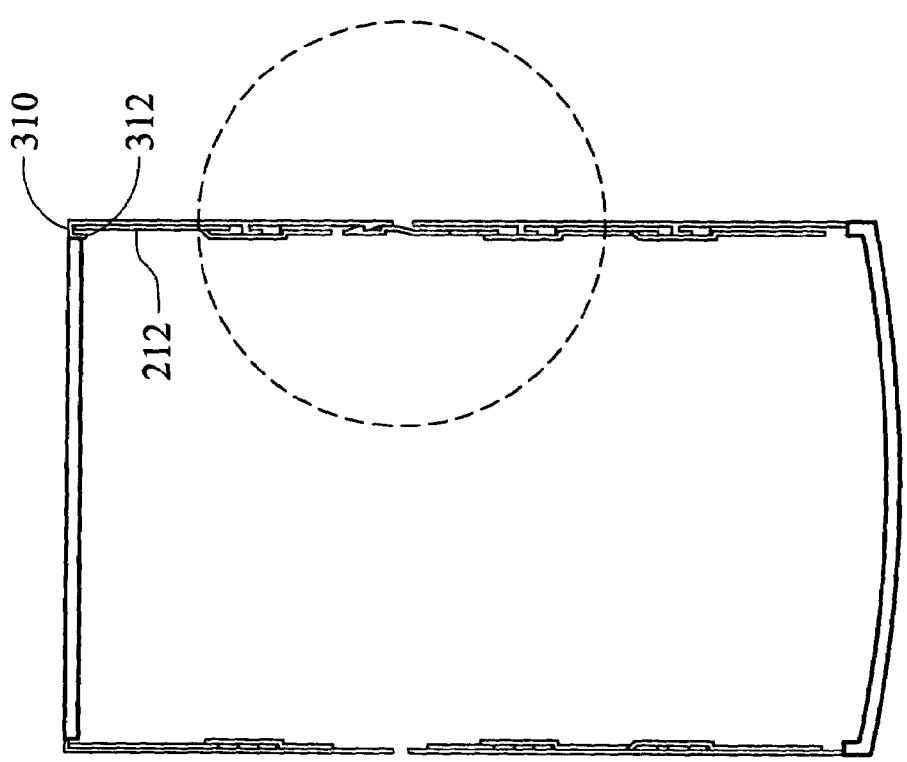
FIG. 3a is a view similar to FIG. 2a but showing that the side panel is latched to the side flange.

As shown in FIG. 3a and FIG. 3b, the lock 203 and the second engaging portion 303 are completely engaged. The first engaging portion 205 and the third engaging portion 305 are completely engaged, and the beam 212 and the fourth engaging portion 312 are completely engaged. The present position is hereinafter referred to as first position.

Due to the plurality of engaging portions, the side flange 20 and the side panel 30 are engaged firmly. The connection of the side flange 20 and the side panel 30 shown in the process above does not require any tool.

FIGS. 4a and 4b show the first position of complete engagement. When disengaging the side flange 20 and the side panel 30, a pin-shaped tool 40 is applied. For example the pin-shaped tool 40 is a stylus of a Personal Digital Assistant (PDA) or other implement with similar properties. When inserting the pin-shaped tool 40 into the hole 301 of the side panel 30, the slanted face 201 of the side flange 20 is pressed, disengaging from the side panel 30.

As shown in FIG. 5a and FIG. 5b, a force is applied via the pin-shaped tool 40 in the direction shown on the slanted face 201 of the side flange 20 until the lock 203 and the second engaging portion 303 are completely disengaged.

Figure 6B:
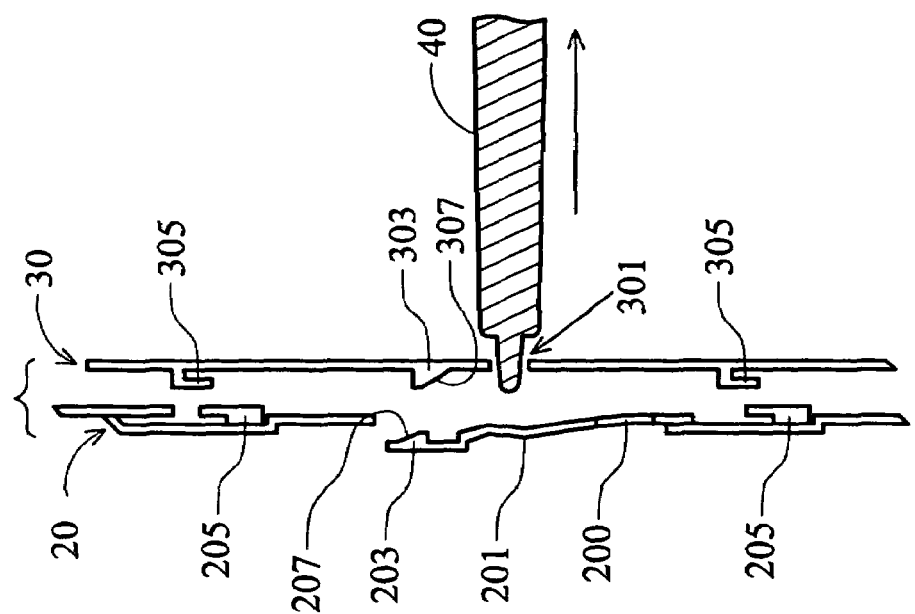
Figure 6A:
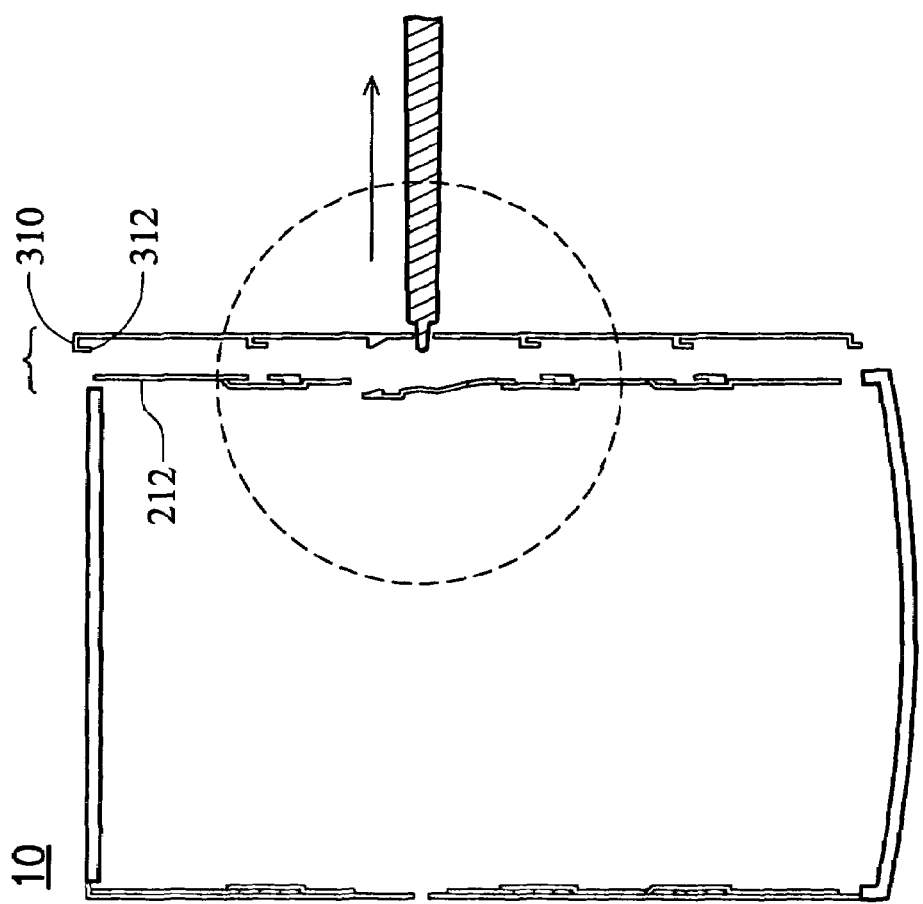
FIG. 6a is a view similar to FIG. 5a showing the side panel totally separated from the side flange of the front cover.

After shifting the side panel 30 a distance upward, the assembly is as shown in FIG. 6a and FIG. 6b. As shown in FIG. 6a and FIG. 6b, the pin-shaped tool 40 is pulled in the direction shown, disengaging the side panel 30 and the side flange 20. The position mentioned above is referred to as the second position.

Thus, when disengaging the latch of the present invention, only a pin-shaped tool is needed, and users can quickly and conveniently disengage or engage the side panel 30 from or to the side flange 20 of the front cover 10 of the PDA 1.

In the present invention, the latching structure can reliably lock the side panel 30 and the side flange 20 of the cover 10 together. By using a suitable tool like a stylus, the lock can be easily released.

Finally, while the invention has been described by way of example and in terms of the preferred embodiment, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mobile electronic product, comprising:
a cover having a side flange adapted for fastening to a lateral side of a mainframe of the mobile electronic product, the side flange forming a cantilever having a lock at a free end of the cantilever and a slanted face behind the lock; and
a side panel, attached to and covering the side flange, having an engaging portion latching with the lock of the cantilever, a hole defined beside the engaging portion and corresponding to the slanted face whereby a tool can be used to extend through the hole to motivate the slanted face to thereby release the latching between the lock and the engaging portion;
wherein the side flange includes an engaging portion, and the side panel includes an additional engaging portion, the engaging portion of the side flange engages with the additional engaging portion of the side panel;
wherein the side panel further comprises a depressible portion at a top thereof, and a second additional engaging portion beside the depressible portion, the side flange forming a beam at a top thereof, the second additional engaging portion engaging the beam by depressing the depressible portion toward the beam.

* * * * *